(12) United States Patent
Sparre

(10) Patent No.: US 7,912,706 B2
(45) Date of Patent: Mar. 22, 2011

(54) ON-LINE PREDICTIVE TEXT DICTIONARY

(75) Inventor: Erik Sparre, Lomma (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1185 days.

(21) Appl. No.: 11/396,814

(22) Filed: Apr. 3, 2006

(65) Prior Publication Data

US 2007/0233463 A1 Oct. 4, 2007

(51) Int. Cl.
*G06F 17/21* (2006.01)
*G06F 17/28* (2006.01)
*G06F 17/27* (2006.01)

(52) U.S. Cl. .................. 704/10; 704/3; 704/9; 715/261; 715/816

(58) Field of Classification Search .................. 704/270, 704/10, 2, 9; 455/414; 715/532, 261, 816
See application file for complete search history.

(56) References Cited

U.S. PATENT DOCUMENTS

| | | | | |
|---|---|---|---|---|
| 5,896,321 | A * | 4/1999 | Miller et al. | 365/189.15 |
| 6,223,059 | B1 * | 4/2001 | Haestrup | 455/566 |
| 6,600,919 | B1 | 7/2003 | Kawase | |
| 7,366,500 | B1 * | 4/2008 | Yalovsky et al. | 455/414.1 |
| 2002/0019731 | A1 * | 2/2002 | Masui et al. | 704/7 |
| 2002/0077808 | A1 | 6/2002 | Liu et al. | |
| 2003/0023424 | A1 | 1/2003 | Weiner | |
| 2003/0104839 | A1 * | 6/2003 | Kraft et al. | 455/566 |
| 2004/0095327 | A1 * | 5/2004 | Lo | 345/169 |
| 2004/0153963 | A1 | 8/2004 | Simpson et al. | |
| 2005/0246365 | A1 | 11/2005 | Lowles et al. | |
| 2005/0270270 | A1 * | 12/2005 | Chadha | 345/157 |
| 2005/0283724 | A1 * | 12/2005 | Griffin | 715/532 |
| 2005/0289141 | A1 | 12/2005 | Baluja | |
| 2006/0142997 | A1 * | 6/2006 | Jakobsen et al. | 704/10 |

OTHER PUBLICATIONS

International Preliminary Report on Patentability for International Application No. PCT/IB06/002709 dated Jun. 9, 2008.
International Search Report and Written Opinion for International Application No. PCT/IB2006/002709 dated Sep. 7, 2007.

* cited by examiner

*Primary Examiner* — James S Wozniak
*Assistant Examiner* — Jialong He
(74) *Attorney, Agent, or Firm* — Renner, Otto, Boisselle & Sklar, LLP

(57) ABSTRACT

Disclosed is electronic equipment (e.g., a communication device) and method for acquiring remote dictionary information for use in SMS applications. The electronic equipment includes a processor that executes an application program within memory, the application program when executed causing the electronic equipment to: request remote dictionary information related to the user information from an associated remote server; receive remote dictionary information from the associated remote server related to the user information; and output the remote dictionary information in a user-sensible format. The method includes receiving one or more symbols from an input device; requesting remote dictionary information related to the received one or more symbols from a predictive text dictionary application stored on an associated remote server; and receiving and outputting the remote dictionary information in a user-sensible format.

18 Claims, 2 Drawing Sheets

ON-LINE PREDICTIVE TEXT DICTIONARY

TECHNICAL FIELD OF THE INVENTION

The present invention relates to a method and apparatus for providing users of electronic equipment access to an on-line (remote) predictive text dictionary.

DESCRIPTION OF THE RELATED ART

Users of electronic equipment, such as, for example, communication devices, mobile phones, personal digital assistants, etc., are increasingly communicating with electronic equipment users through Short Message Service (SMS). SMS is a service available on most electronic equipment that permits the sending of short messages (also known as text messages, messages, or more colloquially SMSes, texts or even txts) between electronic equipment, other handheld devices and, in some instances, landline telephones.

A limitation on the promulgation of SMS service is the difficulty of text entry with the limited keypad provided with conventional electronic equipment. For example, all 26 letters of the English language must be entered using only eight alphanumeric keys. The most common system of text input is referred to as "multi-tap". Using multi-tap, a key is pressed multiple times to access the list of letters on that key. For instance, pressing the "2" key once displays an, "a", twice displays a "b" and three times displays a "c". To enter two successive letters that are on the same key, the user must either pause or hit a "next" button. Multi-tap is easy to understand, and can be used without any visual feedback (i.e., the user can type (by pressing an alphanumeric keypad) without looking at the electronic equipment display). However, multi-tap is not very efficient and is considered a hindrance by many users of electronic equipment.

Manufacturers of electronic equipment are increasingly providing predictive text entry dictionaries and/or systems as a standard software application resident in the electronic equipment. Such dictionaries and systems generally minimize the number of key strokes a user is required to enter to express a word, phrase and/or expression (e.g., a graphical image, a text image, a smiley face, frown, etc.). With predictive text dictionaries, users of electronic equipment do not need to press each keypad number several times in order to get the desired letter. The user simply presses the number corresponding to the letter and, as long as the word exists in the predictive text dictionary, the electronic equipment will generally recognize the word. For instance, pressing "4663" would normally translate to the word "home" on a particular electronic equipment having a conventional English language predictive text entry dictionary installed.

The most widely used systems of predictive text dictionaries are T9, iTap, and eZiText. Each of these systems requires the manufacturer to install a local dictionary of words and/or phrases for every input language that the electronic equipment supports in the electronic equipment. Because memory for compact electronic equipment is typically expensive, the number of dictionary entries for each supported language is limited to only the most common words in a particular language. Thus, often times such dictionaries do not contain the particular word choice that a user desires and the user is then required to enter the complete word using the inefficient multi-tap method mentioned above. Another disadvantage is when a word is not contained in the predictive text dictionary is that the user is required to switch between multiple editing modes (e.g., manual, multi-tap, predictive text, etc.), which can be quite cumbersome to the user.

SUMMARY

In view of the aforementioned shortcomings associated with existing predictive text dictionaries in electronic equipment, there is a strong need in the art for an on-line (remote) predictive text dictionary.

According to an aspect of the invention, a method for entering information in an electronic equipment, the method comprising: receiving one or more symbols from an input device, wherein the symbols correspond to one or more alphanumeric characters; requesting remote dictionary information related to the received one or more symbols from a predictive text dictionary application stored on an associated remote server; receiving the requested remote dictionary information; and outputting the remote dictionary information in a user-sensible format.

According to an aspect of the invention, the received symbols are used to identify remote dictionary information including at least one of a word, phrase or expression stored in the remote predictive text dictionary application.

According to an aspect of the invention, the dictionary information corresponds to words, phrases or expressions from a plurality of language dictionaries.

According to an aspect of the invention further including requesting local dictionary information related to the received one or more symbols from a local predictive text dictionary application resident in the electronic equipment.

According to an aspect of the invention, the received symbols are used to identify at least one or more of a word, a phrase or an expression stored in the local predictive text dictionary application.

According to an aspect of the invention, the local dictionary information is output in a user-sensible format.

According to an aspect of the invention, the local dictionary information is output prior to outputting the remote dictionary information.

According to an aspect of the invention, wherein upon receiving the remote dictionary information, the local dictionary information and the remote dictionary information are output to the user in a predetermined manner.

According to an aspect of the invention, wherein the predetermined manner is based upon a probability that at least one of the local dictionary information or the remote dictionary information are most likely to be selected by an associated user.

According to an aspect of the invention, at least the local dictionary information or the remote dictionary information is selected by selecting a key on the input device.

According to an aspect of the invention, the selected remote dictionary information is stored locally for use by the local predictive text dictionary application.

According to an aspect of the invention, an electronic equipment comprising:
a memory; an input device for allowing an associated user to enter user information; a processor that executes an application program within the memory, the application program when executed causing the electronic equipment to: request remote dictionary information related to the user information from an associated remote server; receive remote dictionary information from the associated remote server related to the user information; and output the remote dictionary information in a user-sensible format.

According to an aspect of the invention further including a display for outputting the dictionary information in the user sensible format.

According to an aspect of the invention, wherein the output of the remote dictionary information is in a predetermined manner.

According to an aspect of the invention, wherein the predetermined manner is based on a predictive text algorithm.

According to an aspect of the invention, wherein the predictive text algorithm consists of one or more of following algorithms: T9, Zi, iTap, or eZiText.

According to an aspect of the invention, wherein the application program further includes local dictionary information stored in the memory.

According to an aspect of the invention, wherein the application program allows selection of at one of the remote dictionary information or the local dictionary information by the user input device.

According to an aspect of the invention, wherein the selected remote dictionary information is stored locally in the memory for use by the local predictive text dictionary application.

According to an aspect of the invention, wherein local dictionary information and remote dictionary are output in the user-sensible format.

According to an aspect of the invention, wherein the local dictionary information is output prior to outputting the remote dictionary information.

According to an aspect of the invention, wherein the remote dictionary information includes unique remote dictionary information that is not stored in the local dictionary information.

According to an aspect of the invention, a method for entering text in an electronic equipment, the method comprising: receiving one or more symbols from a user input device, wherein the symbols correspond to one or more alphanumeric characters that partially form a word, phrase and/or expression; transmitting the one or more symbols to a remote server, wherein the server includes a predictive text dictionary application; receiving one or more words, phrases, and/or expressions from the predictive dictionary application based at least in part on the received one or more symbols; and displaying the one or more words, phrases and/or expressions in a user-sensible format.

According to an aspect of the invention, a computer program stored on a machine readable medium, the program being suitable for use in an electronic equipment as a predictive text dictionary, wherein: when the program is loaded in memory in the electronic equipment and executed causes the electronic equipment to receive remote dictionary information from a remote server based at least in part one or more symbols entered by an associated user to the electronic equipment.

According to an aspect of the invention, a method for transmitting predictive dictionary information, the method comprising: receiving one or more symbols from a user input device, wherein the symbols correspond to one or more alphanumeric characters that partially form a word, phrase and/or expression; identifying one or more words, phrases, and/or expressions from a predictive dictionary application that correspond to at least a portion of the received one or more symbols; and transmitting the at least one or more words, phrases or expressions to the associated electronic equipment.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

It should be emphasized that the term "comprise/comprising" when used in this specification is taken to specify the presence of stated features, integers, steps or components but does not preclude the presence or addition of one or more other features, integers, steps, components or groups thereof."

The term "electronic equipment" includes portable radio communication equipment. The term "portable radio communication equipment", which herein after is referred to as a mobile radio terminal, includes all equipment such as mobile telephones, pagers, communicators, i.e., electronic organizers, personal digital assistants (PDA's), portable communication apparatus, smart phones or the like.

BRIEF DESCRIPTION OF THE DRAWINGS

The foregoing and other embodiments of the invention are hereinafter discussed with reference to the drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

The present invention is directed to electronic equipment 10 capable of accessing a remote predictive text dictionary and providing one or more words, phrases, and/or expressions based on symbols (e.g., alphanumeric characters, etc.) entered by an associated user. In addition, the present invention optionally provides for a locally stored predictive text dictionary resident in a memory associated with the electronic equipment.

Figure 1:
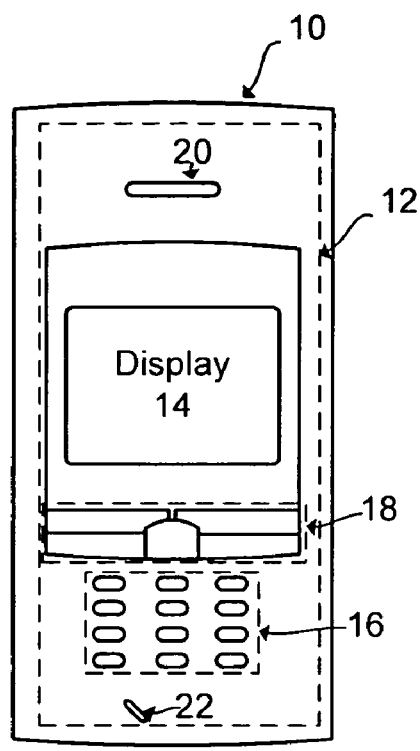
FIGS. 1 and 2 are exemplary schematic diagrams illustrating electronic equipment in accordance with aspects of the present invention.

As illustrated in FIG. 1, the electronic equipment 10 may include a user interface 12 that enables the user easily and efficiently to perform one or more communication tasks (e.g., enter a telephone number, identify a contact, select a contact, make a telephone call, receive a telephone call, look up a telephone number, enter a text message, receive text message, etc). The user interface 12 of the electronic equipment 10 generally includes one or more of the following components: a display 14, an alphanumeric keypad 16, function keys 18, a speaker 20, and a microphone 22.

Figure 2:
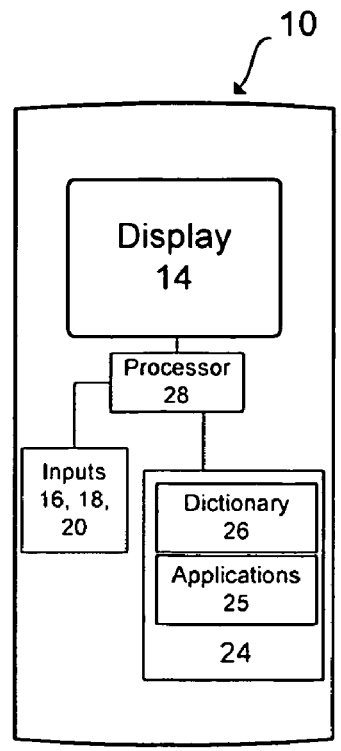

As shown in FIG. 2, the electronic equipment 10 further includes one or more storage devices 24 (e.g., RAM, ROM, etc.) capable of storing application software 25, and may optionally include an electronic dictionary application 26, which is discussed in below in detail. The application software 25, including electronic dictionary application 26 is generally coupled to a processor 28. The processor 28 is programmed to perform the functionality described herein, for example, identifying and sorting possible words, phrases and/or expressions based on user information input by the associated user.

The processor 28 also is coupled with conventional input devices (e.g., alphanumeric keypad 16, function keys 18, microphone 22, etc.), and to the device display 14 and the speaker 20. The user interface 12 facilitates controlling operation of the electronic equipment 10 including initiating and conducting telephone calls and other communications (e.g., SMS communications, Internet communications, etc.).

Figure 3:
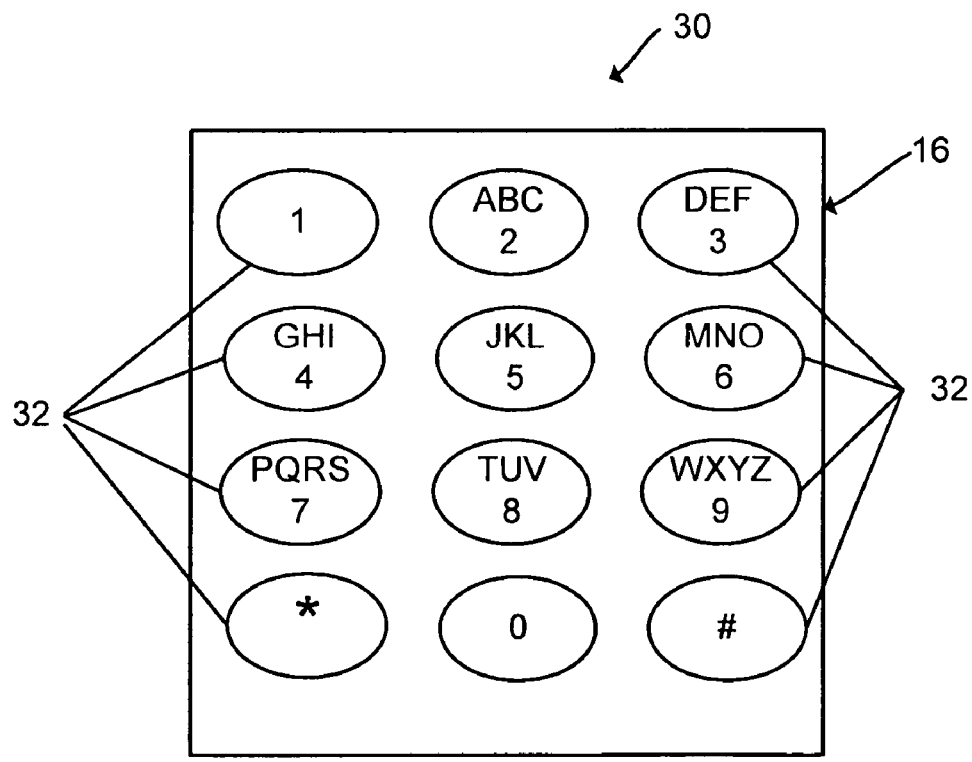
FIG. 3 is an exemplary user input device in accordance with aspects of the present invention.

The user interface 12 is also one mechanism for the user or operator of the electronic equipment 10 to enter characters, letters, words and/or expressions for use by the electronic dictionary application 26. For example, referring to FIG. 3, a user input device 30 is shown. The user input device 30 may be any input device that allows a user to enter information (e.g., symbols, alphanumeric characters, words, phrases, graphic images, text images, etc.) into the electronic equipment 10. As shown in FIG. 3, the user input device 30 is an alphanumeric keypad 16. The alphanumeric keypad 16 includes separate keys 32 for each of the numbers 0-9. The alphanumeric keypad 16 may also include keys that contain symbols (e.g. #, *, @, etc.). One of ordinary skill in the art will readily appreciate that the device display 14 may also be a user input device when properly equipped (e.g., a touch screen display).

The characters that comprise a particular alphabet may be distributed over the keys 32 of the alphanumeric keypad 16. For example, referring to FIG. 3, the twenty-six characters that comprise the English alphabet (e.g., letters A-Z) are distributed over eight of the ten keys that comprise the numerals. The user may enter one or more characters by pressing alphanumeric keys 32. Generally the first alphanumeric key entered by the user will be input (e.g., typed) by the multi-tap method described above. For example, if the user wants to enter a word, phrase and/or expression that begins with a "S", the user would hit the "7" key four times and the letter "S" typically will be output to the display in a user-sensible format.

One of ordinary skill in the art will readily appreciate that the alphanumeric keys illustrated are exemplary and may be suitably modified and/or altered based on a variety of design considerations including, for example, the language of user, country of user, a particular dialect, inclusion of a QWERTY user input device or other user input device, etc.

Typically, once a key is selected or entered, a representation of the symbol (also referred to herein as "user information") entered will be displayed on the display 14 in a user-sensible format (e.g., letter, word, phrase, image, graphical image, graphical character, text character, etc.).

Figure 4:
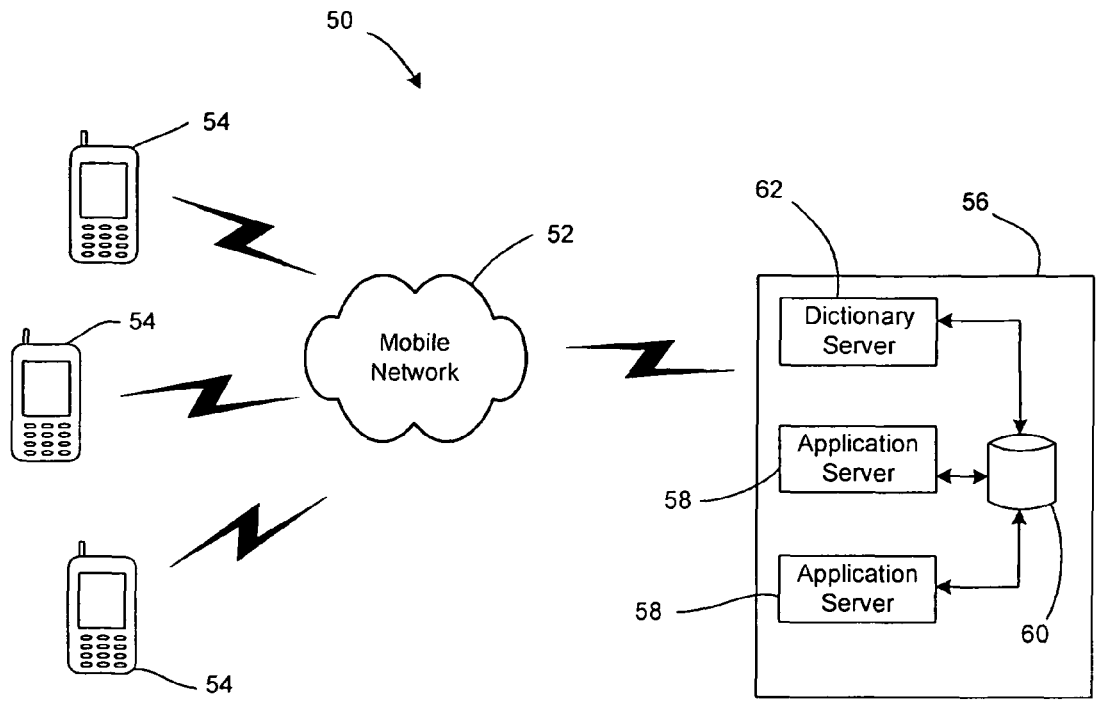
FIG. 4 is a diagrammatic illustration of a communication system including electronic equipment on which the present invention is carried out.

Referring to FIG. 4, a communication system 50 in accordance with aspects of the present invention is illustrated. The communication system 50 includes a mobile network 52, such as a mobile cellular telephony network, that facilitates communication, such as voice communication and/or data transfer between a plurality of electronic equipment 54, such as mobile phones, mobile terminals or the like. The communication system 50 includes a network infrastructure 56, portions of which are used or otherwise accessed by the electronic equipment 54 in connection with aspects of the invention. The electronic equipment 54 may interact with each other and/or the network infrastructure 56 in accordance with any suitable communication standard, including, but not limited to, Short Message Service (SMS), Advanced Mobile Phone Service (AMPS), Digital Advanced Mobile Phone Service (D-AMPS), Global System for Mobile Communications (GSM), Code Division Multiple Access (CDMA), wireless local area network (WLAN), Bluetooth or the like. In other words, the communication system 50 is illustrated in FIG. 4 for purposes of explaining aspects of the present invention, without limiting the invention to a particular communication system design, architecture or communication standard.

The network infrastructure 56 includes one or more application servers, which are indicated generally by the numeral 58, and a storage device 60, such as a memory for storing data accessible or otherwise usable by the application servers 18. At least one of the application servers is an electronic predictive test dictionary server 62. The application servers 58, including the electronic dictionary server 62, are computer servers that serve a variety of functions in the communication system 50.

As is described more fully below, the electronic dictionary server 62 is operable to provide information usable by the electronic equipment 54 to carry out a method of predictive text entry in accordance with aspects of the invention. As used herein, the term "electronic dictionary server" includes any applicable application server and/or hardware capable of providing predictive text entries in response to user information (e.g., information entered by an associated user through a user input device 30, alphanumeric keypad 16, function keys 18 and/or display 14.

For purposes of this discussion, the phrase "remote" means located at a distance from another object and typically capable being accessible through a wireless wide area network. The phrase "local" means housed internally within an object and/or device.

As noted above, the electronic equipment 54 (also referred to as electronic equipment 10) is capable of sending messages (e.g., text messages, txt's, etc.) through SMS services. Typically, when a user desires to enter a text message, the user activates an application locally stored in the electronic equipment 54 and the application initiates SMS service. One of ordinary skill in the art will readily appreciate that the various manufacturers of electronic may provide different mechanisms (e.g., hardware and/or software) in order to activate SMS services on a particular electronic equipment.

Once the SMS application is activated, the user may enter on or more alphanumeric characters from an input device 30 (e.g., alphanumeric keypad 16). This is generally accomplished by the user selecting one or more symbols (e.g., by pressing and de-pressing one or more alphanumeric characters, using a menu-driven selection mechanism, etc.). The electronic equipment 54 then requests remote dictionary information related to the received one or more symbols from a predictive text dictionary application 62 stored on an associated remote server 60. For purposes of this discussion, the phrase "dictionary information" means any expression including for example symbols, characters, words, phrases, acronyms, images, graphical images, etc. regardless of the source of the information. The phrase "remote dictionary information" means dictionary information received from a remote source. Likewise, the phrase "local dictionary information" means dictionary information received from a local source.

In one embodiment of the invention, the electronic equipment transmits the received one or more to the remote server 60 when additional symbols have not been entered for a predetermined time. The predetermined time may be any suitable and/or desired time. Preferably, the predetermined time is less than 10 seconds. In another embodiment, the user may initiate the transmission of the one or more alphanumeric characters by indicating to the electronic equipment 54 that dictionary information is requested (e.g., by pressing "send" or "enter", etc.). The step of indicating may be accomplished by any suitable method, including but not limited to pressing a function key, pressing a send key, etc.

In response to receiving the one or more symbols input by the associated user (also referred to as "user input"), the remote predictive text dictionary application 62 determines whether any remote dictionary information corresponds to and/or are associated with the user input. Remote server 60 then transmits the relevant remote dictionary information, if any, to the electronic equipment 54. The electronic equipment 54 receives the requested remote dictionary information, if any, and outputs the remote dictionary information in a user-sensible format on the electronic equipment 54 (e.g. through display 14).

For example, if the user would like to type and/or enter the word "awesome", the user would press key 2 and then key 9 in the user input device 30. The SMS application would determine that this corresponds to the letters "A", "B", "C" and "W", "X", "Y", "Z", respectively. If the user does not press any additional symbols or keys for a predetermined time or otherwise indicates that a selection of words, phrases and/or expressions corresponding to combinations having a first letter of "A", "B" or "C" and second letter of "W", "X", "Y" or "Z" is desired, information input by the user will be transmitted to the predictive text dictionary application 62 located on the remote server 60. In response, assuming the predictive text dictionary application has at least one entry associated with the characters (e.g., entries beginning with any of the combination of words, phrases or expressions including, for example: "AW", "AX", "AY", "AZ", "BW", "BX", "BY", "BZ", "CW", "CX", "CY", "CZ", etc.), the predictive text dictionary application will transmit one or more entries of remote dictionary information associated with the entered combination to the electronic equipment 54. The electronic equipment 54 will then output the remote dictionary information entries generally to the display 14. One of ordinary skill in the art will readily appreciate that the number of characters input by the user will often times be fewer characters than the dictionary information transmitted from the predictive text dictionary to electronic equipment 54.

Figure 5A:
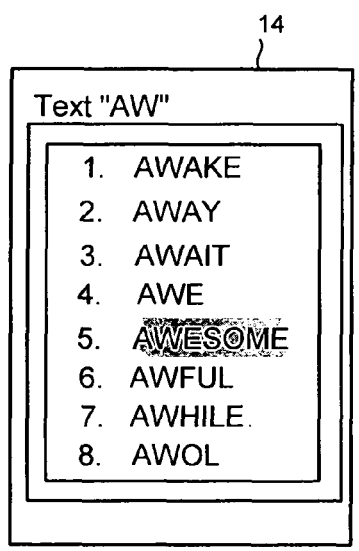
FIGS. 5A and 5B are exemplary listings of dictionary information output in a user-sensible format in accordance with aspects of the present invention.
Figure 5B:
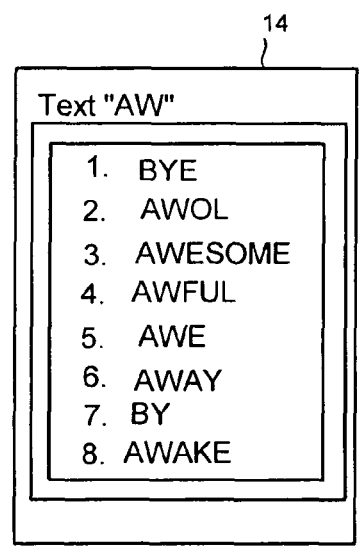

Referring to FIGS. 5A and 5B, an exemplary user-sensible format is shown. FIG. 5A, illustrates presenting the remote dictionary information through display 14 in a user-sensible format based on alphabetical order of the remote dictionary information. FIG. 5B, illustrates presenting the remote dictionary information through display 14 based on an algorithm and/or user behavior that presents the remote dictionary information according to the probability that a user will select the higher prioritized entry. For example, an algorithm or behavior of the user may indicate that the acronym BYE is the most likely to be selected, followed in or of priority by the following entries: AWOL, AWESOME, AWFUL, AWE, AWAY, BY, and AWAKE, as shown in FIG. 5B. Additional words, phrases and expressions may also be included in the list of entries and made available to the user by traversing the selection mechanism up or down through the list of entries. These entries are not shown due to the limited amount of information that may be displayed at one time on an electronic equipment 10. Suitable algorithms for prioritizing entries include for example, T9, Zi, iTap, eZiText, etc.

In another embodiment, the user may indicate that entries corresponding to more than one language may be selected. Such functionality allows a user to conveniently and efficiently select information from multiple languages without switching input modes on the electronic equipment 54.

The user may select any one of the entries in a number of ways. For example, the user may press the number on the user input device 30 that corresponds to the entry number associated with the dictionary information presented in the display 14. As another example, the user may also utilize arrow keys, a selection bar, navigation tool or any other suitable mechanism to select the desired entry. Preferably, once a remote entry is selected by the user, the entry is stored locally in memory 24 for use by a local predictive text entry application, which is discussed below.

Once the desired text is selected, the user may continue typing a SMS message and the process described above will continue for each character and/or characters entered by the user.

Due to possible time delays associated with SMS wide area network communications and user desired response time, a preferred embodiment of the present invention includes providing a local predictive text dictionary application 26 in the electronic equipment 54. The local predictive text dictionary application 26 is preferably stored in memory 24, as discussed above. The local predictive text dictionary application 26 performs in a substantially identical manner as the remote predictive text dictionary application, as described above. Any differences between the local predictive text dictionary application and remote predictive text dictionary application 62 are typically transparent to the user.

For example, once the SMS application is activated, the user may enter one or more symbols (e.g., alphanumeric characters) from, for example, an input device 30 and/or display 14. The electronic equipment 54 then requests local dictionary information and remote dictionary information related to the received one or more symbols from the local predictive text dictionary application 26 resident in memory 25 and the remote predictive text dictionary application 62 located on the remote server 60. In response to receiving the one or more symbols input by the associated user, the local predictive text dictionary application 26 and the remote predictive text dictionary 62 transmit their respective dictionary information to the electronic equipment 54. The electronic equipment 54 receives the requested from either the local dictionary information or the remote dictionary information and outputs the first received dictionary information in a user-sensible format.

Due to transmission time associated with transmitting the user input symbols to and from the remote dictionary server 62, the remote dictionary information will often times arrive after the local dictionary definition information becomes available to the electronic equipment 54. In order to meet the user's demand for quick and timely access to the dictionary information, in one embodiment, the local dictionary information and/or first received dictionary information is preferably output to the user prior to receiving the remote dictionary information and/or the later received dictionary information.

Once the later received dictionary information is received (e.g., the remote dictionary data information) by the electronic equipment 54, the remote dictionary data and the local dictionary data may be combined and displayed to the user in a user sensible format. Preferably, the remote dictionary information and the local dictionary information are culled to remove any redundant entries. If the user has not begun navigating through the first received dictionary information (e.g., local dictionary information), the local dictionary information and the remote dictionary information may be combined and displayed. As stated above, the dictionary information may be output in a user-sensible format (e.g. based on probability of use, alphabetic order, user's past SMS use, etc.).

If the user has begun navigating through the local dictionary before the later received dictionary information (e.g., remote dictionary information) becomes available to the electronic equipment 54, the remote dictionary information may be added to the end of the list of the received dictionary information (e.g., local dictionary information). In this manner, the user may begin traversing the list of possible dictionary information entries without waiting for receipt of the later received dictionary information (e.g., remote dictionary information).

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". It should also be noted that although the specification lists method steps occurring in a particular order, these steps may be executed in any order, or at the same time.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

What is claimed is:

1. A method for entering information in an electronic equipment for composition of a message, the method comprising:
   receiving one or more symbols from an input device to create a message to be transmitted to and read by a recipient, wherein the symbols correspond to one or more alphanumeric characters;
   requesting local dictionary information related to the received one or more symbols from a local predictive text dictionary application resident in the electronic equipment;
   requesting remote dictionary information related to the received one or more symbols from a predictive text dictionary application stored on an associated remote server, wherein the request for remote dictionary information is transmitted automatically upon expiration of a predetermined period of time in response to the received one or more symbols from the input device;
   receiving the requested local dictionary information and the remote dictionary information, wherein the received local dictionary information and the remote dictionary information includes predictive text that begins with the symbols received from the input device; and
   outputting the predictive text in a user-sensible format, wherein the predictive text from the local dictionary information is output in priority before the predictive text received from the remote dictionary information.

2. The method according to claim 1, wherein the received symbols are used to identify remote dictionary information including at least one of a word, phrase or expression stored in the remote predictive text dictionary application.

3. The method according to claim 2, wherein the remote dictionary information corresponds to words, phrases or expressions from a plurality of language dictionaries.

4. The method according to claim 1, wherein the received symbols are used to identify at least one or more of a word, a phrase or an expression stored in the local predictive text dictionary application.

5. The method according to claim 1, wherein upon receiving the remote dictionary information, the local dictionary information and the remote dictionary information are output to the user in a predetermined manner.

6. The method according to claim 5, wherein the predetermined manner is based upon a probability that at least one of the local dictionary information or the remote dictionary information are most likely to be selected by an associated user.

7. The method according to claim 6 further including selecting one of at least the local dictionary information or the remote dictionary information by selecting a key on the input device.

8. The method according to claim 7 further including storing the selected remote dictionary information locally for use by the local predictive text dictionary application.

9. The method according to claim 1, wherein the remote dictionary information includes one or more words that have a spelling that corresponds to the received symbols.

10. An electronic equipment comprising:
    a memory, wherein the memory includes a local predictive text dictionary and a predictive text application program;
    an input device for allowing an associated user to enter user information for composition of a message to be transmitted to and read by a recipient;
    a processor that executes the predictive text application program within the memory, the predictive text application program when executed causing the electronic equipment to:
    request local dictionary information from the local predictive text dictionary, wherein the request includes at least a portion of the user information received from the input device;
    request remote dictionary information related to at least a portion of the user information from an associated remote server, wherein the request for remote dictionary information is transmitted automatically upon expiration of a predetermined period of time in response to the received one or more symbols from the input device;
    receive local dictionary information and remote dictionary information, wherein the received local dictionary information and the remote dictionary information includes predictive text that begins with the user information received from the input device; and output the predictive text in a user-sensible format, wherein the predictive text from the local dictionary information is output in priority before the predictive text received from the remote dictionary information.

11. The electronic equipment of claim 10 further including a display for outputting the local dictionary information and the remote dictionary information in the user sensible format.

12. The electronic equipment of claim 10, wherein the output of the remote dictionary information is in a predetermined manner.

13. The electronic equipment of claim 12, wherein the predetermined manner is based on a predictive text algorithm.

14. The electronic equipment of claim 13, wherein the predictive text algorithm consists of one or more of following algorithms: T9, Zi, iTap, or eZiText.

15. The electronic equipment of claim 10, wherein the application program allows selection of at least one of the remote dictionary information or the local dictionary information by the user input device.

16. The electronic equipment of claim 15, wherein the selected remote dictionary information is stored locally in the memory for use by the local predictive text dictionary application.

17. The electronic equipment of claim 15, wherein the remote dictionary information includes unique remote dictionary information that is not stored in the local dictionary information.

18. A computer program stored on a non-transitory machine readable medium, the program being suitable for use in an electronic equipment as a predictive text dictionary, wherein:

when the program is loaded in memory in the electronic equipment and executed causes the electronic equipment to receive local dictionary information from a local predictive text dictionary resident in the electronic equipment and receive remote dictionary information from a remote server, wherein the local dictionary information and the remote dictionary information is based at least in part one or more symbols entered by an associated user to the electronic equipment, wherein the one or more symbols form a portion of a message to be transmitted to and read by a recipient and the one or more symbols are transmitted automatically to the remote server upon expiration of a predetermined period of time in response to the received one or more symbols entered by the associated user and the local dictionary information and the remote dictionary information corresponds to predictive text that begins with one or more symbols entered by the associated user and output the local dictionary information in priority before the remote dictionary information.

* * * * *